United States Patent
Kobayashi et al.

(10) Patent No.: US 6,647,805 B2
(45) Date of Patent: Nov. 18, 2003

(54) TRANSIT-TIME DIFFERENCE TYPE ULTRASONIC FLOWMETER

(75) Inventors: Tamotsu Kobayashi, Yokohama (JP); Kunikazu Shigeta, Hachioji (JP); Toru Fujii, Tokyo (JP)

(73) Assignee: Tokyo Keiso Kabushiki-Kaisha, Tokyo (JP)

( * ) Notice: Subject to any disclaimer, the term of this patent is extended or adjusted under 35 U.S.C. 154(b) by 0 days.

(21) Appl. No.: 09/985,449

(22) Filed: Nov. 2, 2001

(65) Prior Publication Data

US 2002/0062690 A1 May 30, 2002

(30) Foreign Application Priority Data

Nov. 27, 2000 (JP) ........................................ 2000-359495

(51) Int. Cl.[7] ................................................. G01F 1/66
(52) U.S. Cl. .................................................. 73/861.27
(58) Field of Search ....................... 73/861.27, 61.1 R, 73/194, 560, 597, 861.28, 861.23; 324/617, 521, 522, 601, 605; 702/89, 107, 124, 126, FOR 103, 104, 106; 340/310.04

(56) References Cited

U.S. PATENT DOCUMENTS 3,935,735 A * 2/1976 Lee .......................... 73/861.29
4,633,719 A * 1/1987 Vander Heyden ........ 73/861.28
5,123,286 A * 6/1992 Baumgartner ............ 73/861.27
5,521,491 A * 5/1996 Najam ......................... 324/86
6,305,233 B1 * 10/2001 Braathen et al. ......... 73/861.28
6,374,674 B1 * 4/2002 Mine ........................... 73/606

* cited by examiner

Primary Examiner—Edward Lefkowitz
Assistant Examiner—Jewel V Thompson
(74) Attorney, Agent, or Firm—Israel Gopstein

(57) ABSTRACT

A transit-time difference type ultrasonic flowmeter comprises a pair of ultrasonic transducers mounted on a flow tube at an upstream side and a downstream side respectively, a switching device for switching the operational mode of each of the transducers alternatively to its transmitting or receiving mode, an amplifier for amplifying the signal received by the transducer of the receiving side, and a data reduction equipment includes an analog-digital converter and a digital signal processor; the converter converts the waveform into a plurality of voltage-time data sets; and the processor picks up an object peak of the voltage-time data sets on the basis of the time, or the data on the voltage, or determines the peaks of maximum voltage included within the waveform of the voltage-time data sets as an object peak, estimates at least one zero-cross point confined by the object peak or a peak adjacent to the object peak through the calculation made on the plurality of voltage-time data sets distributing along the time axis close to the zero-cross points, and finds the time required for propagating the wave from one zero-cross point or the average time required for propagating the wave from a plurality of zero-cross points.

6 Claims, 4 Drawing Sheets

TRANSIT-TIME DIFFERENCE TYPE ULTRASONIC FLOWMETER

BACKGROUND OF THE INVENTION

1. Technical Field

The present invention relates to an improvement on a transit-time difference type (referred hereinafter to as time difference type) ultrasonic flowmeter.

2. Description of the Prior Art

The arrangement of the transit-time difference type ultrasonic flowmeter of the prior art will now be described with reference to FIG. 6.

A pair of ultrasonic transducers $2a$ and $2b$ are provided on both ends of a straight section $1a$ of a flow tube 1 including a fluid inlet $1b$ and a fluid outlet $1c$ extending vertically from the ends of the straight section $1a$.

A switching device 3 is provided between the ultrasonic transducers $2a$ and $2b$ and an excitation pulse generator 4 and an amplifier 5 receiving the signal from one of the transducers. The switching device 3 delivers pulses from the excitation pulse generator 4 to the one of the transducers and receives signals from the other of the transducers and delivers the signals to the amplifier 5 vise versa.

The signal for causing the switching is not described herein.

A comparator 6 detects the time (the received time) on which the received waveform amplified through the amplifier 5 exceeds the reference voltage provided by a source of reference voltage 7.

A data reduction equipment 8 receives the output from the comparator 6, calculates the time duration from the excitation time to the received time, in other words the ultrasonic wave propagating time i.e. the time required for propagating the ultrasonic wave generated by one of the ultrasonic transducers through fluid to the other transducer, and output a flow rate signal obtained by effecting the following equation.

$$Tu-Td=2LV/C^2$$
$$\therefore V=(Tu-Td)C^2/2L$$
$$Q=SV$$

wherein Tu is a time for propagating the ultrasonic wave upstream-wards, Td is a time for propagating the ultrasonic wave downstream-wards, V is a flow velocity through the flow tube, Q is a flow rate through the flow tube, C is acoustic velocity, and L is a distance between the transducers.

However, the following technical problems are still present in the time difference type ultrasonic flowmeter of the prior art.

The comparator cannot distinguish the received signal from noise superposed on it when the flowmeter is operated under the circumstance flooded by electric pulse noise. In such a case, the measured value of the propagation time will inevitably be fluctuated and the affect caused thereby will be augmented when the flowmeter is used for measuring relatively low flow rate.

Further, provided that impurities such as bubbles or solid particles are included in the fluid, the amplitude of the received signal is tend to attenuate, and sometimes makes the result of the measurement unstable.

As shown in FIG. 7, the received waveform with no interference is illustrated by a solid line, the waveform attenuated under the effect of impurities such as bubbles or solid particles is illustrated by a broken line, and the reference voltage Vc of the comparator is illustrated by a dashed line. As can be seen from FIG. 7, the waveform to be measured is varied under the effect of the attenuation, so that the consistent measurement cannot be effected since the propagating time is measured at Ta or Tb.

SUMMARY OF THE INVENTION

In order to solve the above mentioned problem, the first transit-time difference type ultrasonic flowmeter of the present invention comprises:

a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

the data reduction equipment includes an analog digital converter and a digital signal processor;

the analog-digital converter converts the waveform of the received signal amplified by the amplifier into a plurality of voltage-time data sets; and the digital signal processor picks up on the basis of the data of time an object peak from the waveform of the voltage-time data sets, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points. The first transit-time difference type ultrasonic flowmeter is characterized by the fact that the object peak is picked up from peaks present within the preset time interval.

The second transit-time difference type ultrasonic flowmeter of the present invention comprises:

a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

the data reduction equipment includes an analog-digital converter and a digital signal processor;

the analog-digital converter converts the waveform of the received signal amplified by the amplifier into a plurality of voltage-time data sets; and the digital signal processor picks up on the basis of the data on the value of voltage an object peak from the waveform of the voltage-time data sets, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points. The second transit-time difference type ultrasonic flowmeter of the first embodiment is characterized by the fact that the object peak is picked up from peaks of the voltage over the predetermined value.

The third transit-time difference type ultrasonic flowmeter of the present invention comprises:

a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

the data reduction equipment includes an analog-digital converter and a digital signal processor;

the analog-digital converter converts the waveform of the received signal amplified by the amplifier into a plurality of voltage-time data sets; and the digital signal processor determines the peak of maximum voltage included within the waveform of the voltage-time data sets as an object peak, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points.

According to the first embodiment, the digital signal processor measures the height of the object peak and estimates the amount of attenuation of the received signal due to the impurities such as bubbles or solid particles included in the fluid, wherein if the amount of attenuation is larger than the preset value, the calculation for estimating the zero-cross points is suspended, and the flow rate signal is output by adopting the measured value of time required for propagation or the output value of flow rate obtained on the last measurement of the repeatedly effected measurements.

According to the second embodiment, the digital signal processor measures the height of the object peak, makes comparison between the height of the object peak when the ultrasonic wave propagates upstream-wards and the height of the object peak when the ultrasonic wave propagates downstream-wards, wherein if the difference between the height of the object peaks is larger than the predetermined value, the calculation for estimating the zero-cross points is suspended, and the flow rate signal is output by adopting the measured value of time required for propagation or the output value of flow rate obtained on the last measurement of the repeatedly effected measurements.

According to the third embodiment, the digital signal processor measures a ratio defined between the heights of the peaks before and after the zero-cross point which is the object of the measurement of time required for propagation, if the difference between the obtained ratio of the heights of peaks and a ratio obtained upon measured on the fluid including no impurities such as bubbles or solid particles is larger than the predetermined value, the calculation for estimating the zero-cross points is suspended, and the flow rate signal is output by adopting the measured value of time required for propagation or the output value of flow rate obtained on the last measurement of the repeatedly effected measurements.

According to the fourth embodiment, the digital signal processor is adapted to alter according to the variation of the heights of the object peaks the number of zero-cross points defining the base on which the mean value of the time required for propagation is calculated.

According to the fifth embodiment, the digital signal processor processes the plurality of voltage-time data set through least squares method, calculate a regression line or curve, and estimates the time required for propagation of the zero-cross points.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

The arrangement of the first transit-time difference type ultrasonic flowmeter of the present invention will now be described with reference to FIG. 1.

Figure 6:
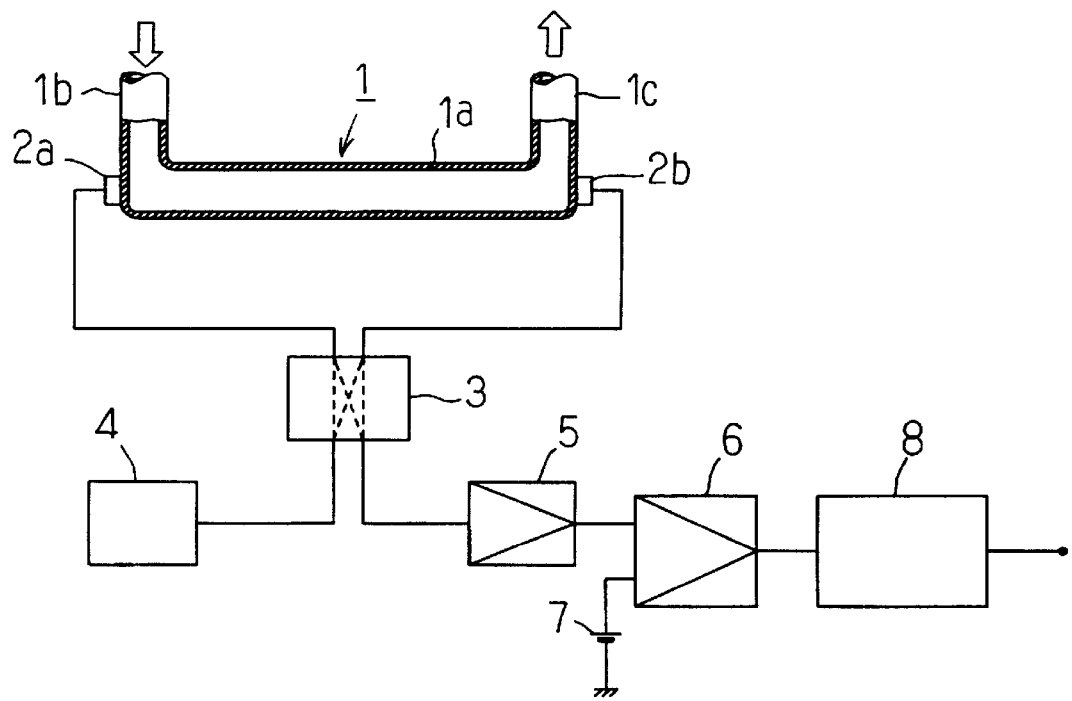
FIG. 6 is a schematic partially broken view showing the general arrangement of the transit-time difference type ultrasonic flowmeter of the prior art.
Figure 7:
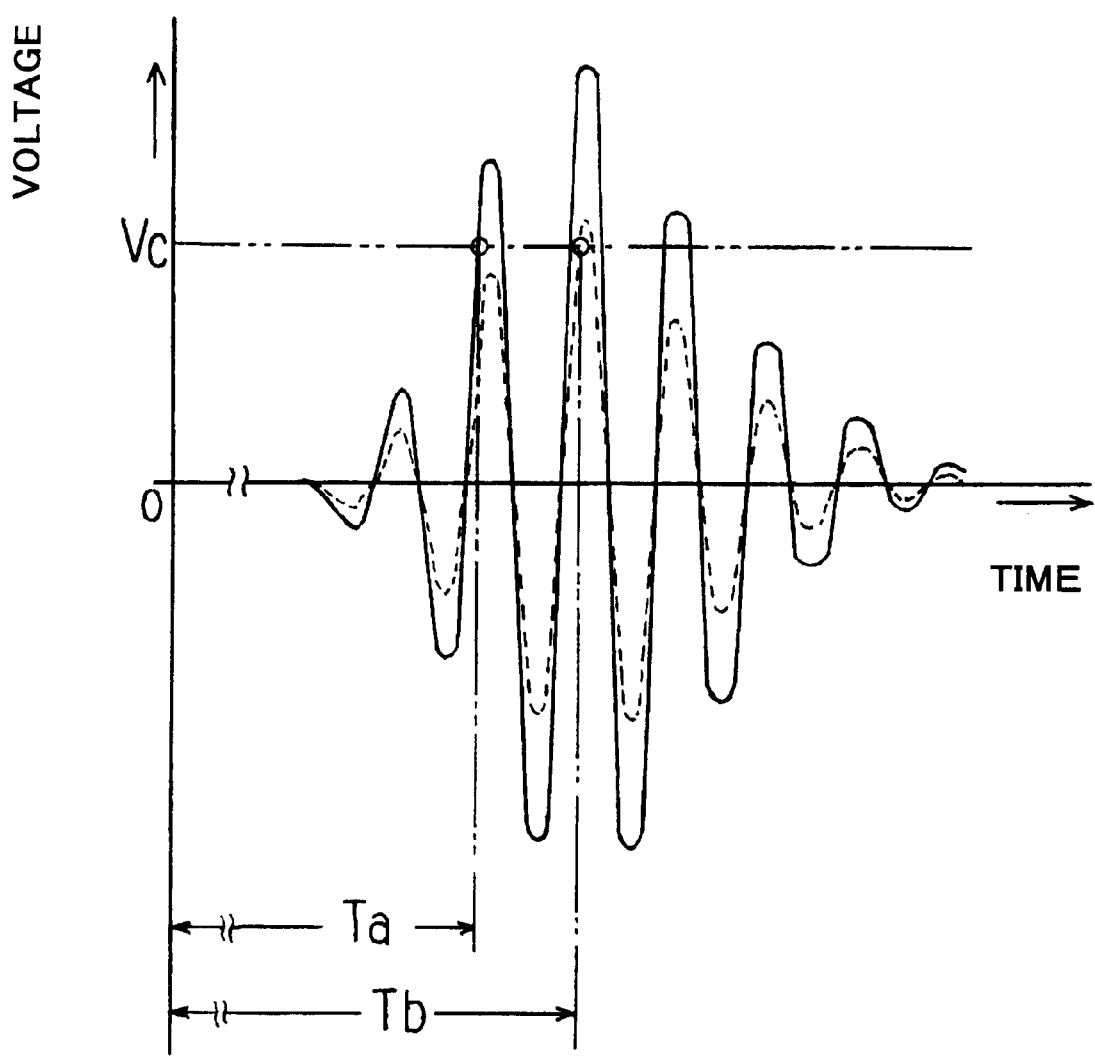
FIG. 7 is a graph showing the waveform of the received signal obtained through the transit-time difference type detection of the prior art.

Those denoted in this figure by reference numerals 1–5 are identical with those designated on FIG. 6 so that no descriptions are made thereon.

The data reduction equipment 8 of the flowmeter of the present invention includes an analog-digital converter (referred hereinafter to as ADC) 9 of a sampling rate of a few 10 MS/s and a resolution of 10–12 bits, and a high-speed digital signal processor (referred hereinafter to as DSP) 10. The received waveform amplified by the amplifier 5 is processed by the data reduction equipment 8 to provide signals indicating a flow rate.

The received signals (analog signals) obtained from the ultrasonic transducers 2a or 2b through the switching device 3 and the amplifier 5 and delivered to the data reduction equipment 8 are sampled by the ADC 9 and converted to the voltage-time digital data set.

In the sampling operation of the ADC 9, data are adapted to be taken within a sampling window SW of suitable time interval, in order to avoid the overload of the memory device.

Figure 2:
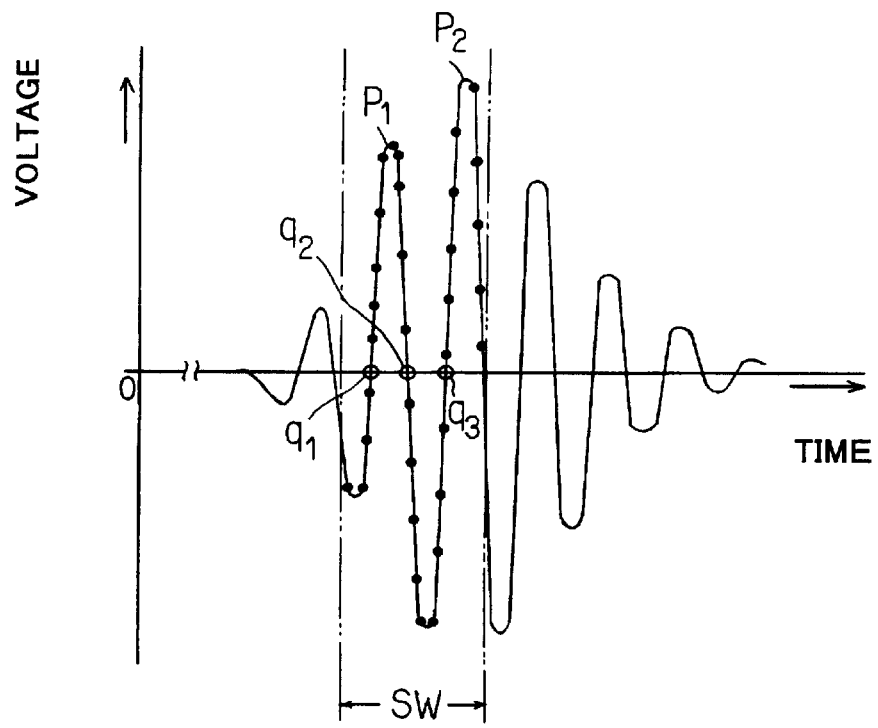
FIG. 2 is a graph showing the waveform of the received signal for illustrating the first transit-time difference type detection.

As a consequence of the sampling operation, data as shown in FIG. 2 as ● are obtained (in order to avoid the complication of the graph, the number of the designation of data are reduced around the peak $P_1$).

Those designated by ○ in the same graph are zero-cross points confined by those peaks.

According to the present invention the DSP 10 picks up a peak of predetermined rank order, e.g. the first peak as an object peak. In other words, the object peak is selected on the basis of the data on the time. Zero-cross points such as $q_1$, $q_2$, $q_3$ confined by peaks $P_1$, $P_2$ are then estimated through processing predetermined number of data sets distributing along the time axis, close to the zero-cross points.

In the case that a plurality of the zero-cross points are present, the mean value of the times of the zero-cross points is calculated, and the time elapsed from the time in which the ultrasonic wave is generated to the mean value is adopted as the time Tu or Td required for propagate the ultrasonic wave.

In practice, the direction of the ultrasonic wave is inverted by the operation of the switching device 3 and the time Tu or Td required for propagate the ultrasonic wave is measured. Then the value of flow rate through the tube is calculated from the time Tu and Td required for propagate the ultrasonic wave, acoustic velocity C, and the distance L between the ultrasonic transducers.

The second transit-time difference type ultrasonic flowmeter of the present invention will now be described.

Figure 3:
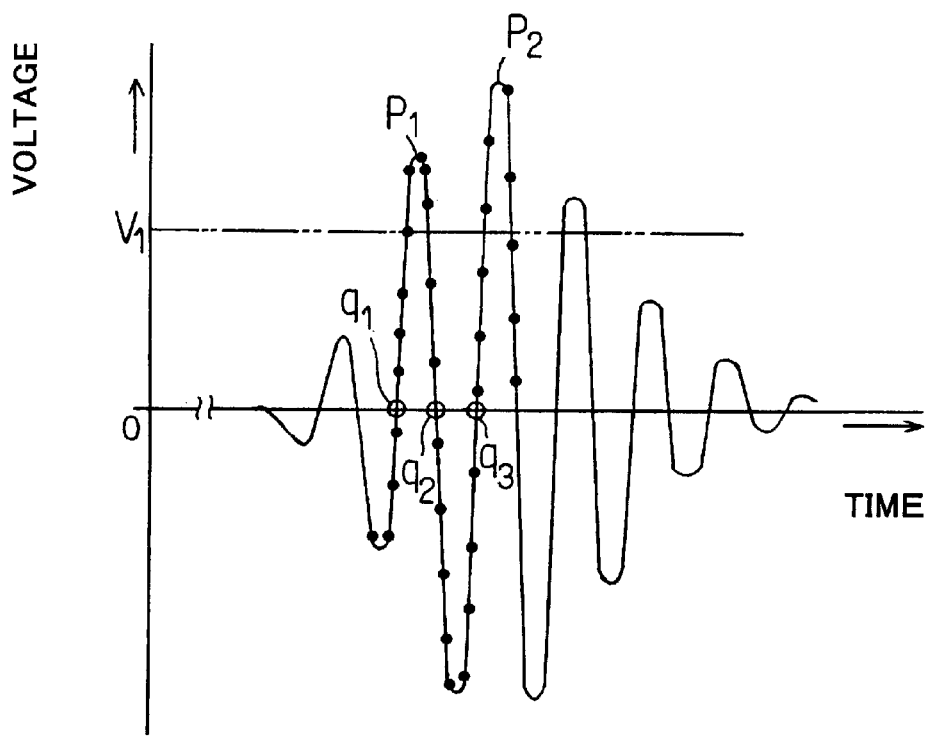
FIG. 3 is a graph showing the waveform of the received signal for illustrating the second transit-time difference type detection.

Although the arrangement of the ultrasonic flowmeter of the second type itself is the same as that of the first type, the manner for picking up the object peak is different. The peaks of the voltage higher than the predetermined value (the voltage value $V_1$, shown in FIG. 3 by dotted line) is adopted as the object peak, i.e. the second type is characterized by the fact that the selection of the object peak will be made on the basis of the data on the value of the voltage.

In other words, the DSP 10 scans the data obtained from the ADC 9 precisely, picks up a peak of predetermined rank order, e.g. the first peak $P_1$ as an object peak from peaks of the voltage over the predetermined threshold voltage value $V_1$. One or more zero-cross points such as $q_1$, $q_2$, $q_3$ confined by peaks $P_1$, $P_2$ are then processed in the same manner as that made on the first type so as to obtain the signal indicating a flow rate.

Comparing the above mentioned first and second types, provided that the acoustic velocity within the fluid is known and can be regarded as substantially constant, the first type in which the object peak is selected on the basis of the data on the time can be adopted. Whereas, provided that the acoustic velocity is unknown or varied, the second type in which the object peak is selected on the basis of the data on the value of voltage can be adopted.

The third transit-time difference type ultrasonic flowmeter of the present invention will now be described.

In the above-mentioned first and second types, the object peak is the first peak within the sampling window SW or the peak over the threshold value of voltage $V_1$. However, according to the experiment or observation, the amount of attenuation of the amplitude attributable to the presence of bubbles (or impurities such as solid particles) depends only on the amount of bubbles, and the shape of the envelope of the amplitude of the form of the wave propagated through the fluid including bubbles is analogous to that the wave propagated through the fluid with no bubbles.

In this connection, taking the above mentioned fact into account, it is preferred to adopt the peak $P_{max}$ of maximum value as the object peak to provide a flowmeter of hardly affected by the entering and mixing of the bubbles.

The First Embodiment

Figure 4:
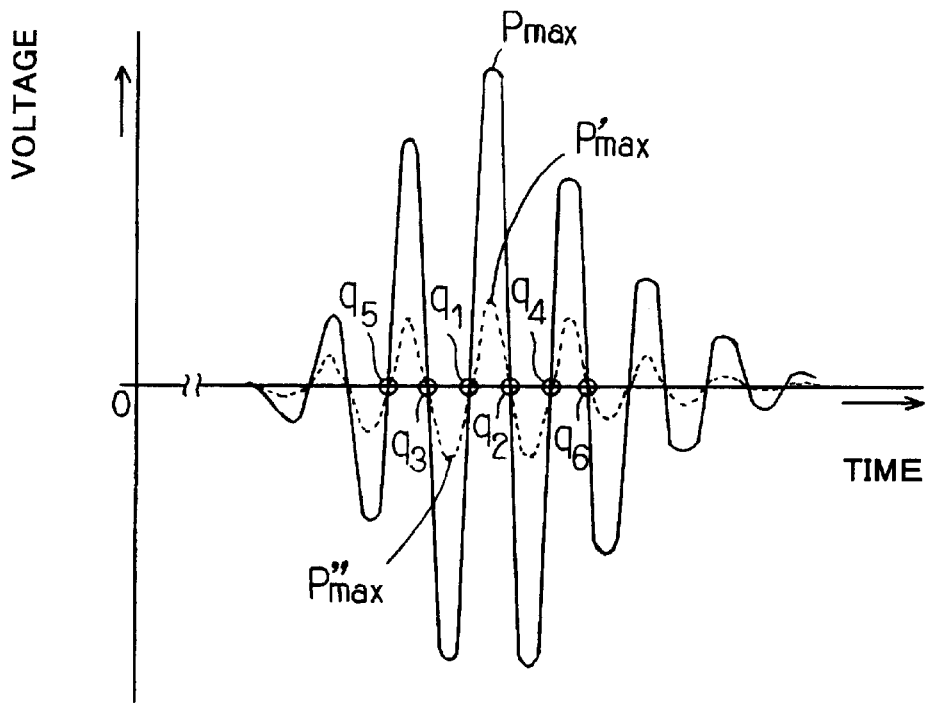
FIG. 4 is a graph showing the waveform of the received signal and that attenuated.

In FIG. 4, the waveform of the received signals with substantially no attenuation is designated by solid line, the waveform of the received signals attenuated substantially under the effect of bubbles is designated by dashed line, and the zero-cross points to be processed are designated by ○.

Also in FIG. 4, the $P_{max}$ is a value of a peak obtained on the fluid with no bubbles, and the $P'_{max}$ is a value of a peak attenuated substantially under the influence of bubbles.

When the voltage is attenuated considerably, i.e. the value of $P'_{max}/P_{max}$ is smaller than 0.1, it can be determined that S/N ratio is inferior. In such a case, the flow rate signal of high precision cannot be obtained through the calculation of the data on the time required for propagation at the zero-cross points.

In this connection, when the value of $P'_{max}/P_{max}$ is smaller than the predetermined value (e.g. 0.1), the calculation on the zero-cross points is suspended, and the output hold is effected. In the output hold operation, the measured value of time required for propagation obtained on the last measurement of the repeatedly effected measurements, or the output value of flow rate is adopted to provide the flow rate signal.

The output hold prevents the output value of the flow rate signals from fluctuation even if bubbles are included in the fluid. Provided that the alarm device for monitoring the flow rate signal output is included, the wrong operation of the alarm device caused by the entrance of bubbles can be avoided through the output hold.

The Second Embodiment

The second embodiment is provided on the basis of the observation on the object zero-cross points when bubbles are included within the fluid, and the results obtained through the observation is that the time required for propagate the ultrasonic wave is varied slightly according to the amount of bubbles present on the propagation path of the ultrasonic wave. Although the amount of variation of the propagation time due to the presence of bubbles within the fluid is very small relative to the whole propagation time, the influence exerted on the maximum value of the measured amount of flow rate is substantial, i.e. cannot be neglect.

However, the errors in measurement can be reduced by completing the measurement of the transit time difference for the period of time through which the amount of attenuation of the amplitude is constant, or for the period of time through which the same bubbles are present on the propagation path.

In the first and the third type of the present invention, the DSP 10 measures the height of the object peak (e.g. the object peak $P_{max}$ in FIG. 4), makes comparison between the height of the peak when the ultrasonic wave propagate upstream-wards (at the measurement of Tu) and the height of the peak when the ultrasonic wave propagate downstream-wards (at the measurement of Td), and determines that the error in measurement due to bubbles can be neglectable if the difference between the height of the peaks is smaller than the preset value, and outputs the signals according to the first and the third type of the present invention.

On the other hands, if the difference between the height of the peaks is larger than the preset value, the error in measurement due to bubbles is determined to be substantial, the calculation of the zero-cross points is suspended, and the output hold is effected as described in the first embodiment. In the output hold operation, the measured value of time required for propagation obtained on the last measurement of the repeatedly effected measurements, or the output value of flow rate is adopted to provide the flow rate signal.

The Third Embodiment

Whereas the duration of the ultrasonic wave is generally a few microsecond, the time required for passing the bubble through the propagation path of the ultrasonic wave is a few hundred millisecond so that the probability of the sudden transition of the amount of attenuation of the ultrasonic wave signal by bubbles for the duration of the ultrasonic wave signal is low. However, the sudden transition of the amount of attenuation will cause the error.

In the third embodiment, the DSP 10 measures the height of the positive and negative peaks (e.g. the positive peak $P'_{max}$ and the negative peak $P''_{max}$ of FIG. 4) before and after the zero-cross point, compares the ratio between the obtained heights with the ratio of the heights of the positive and negative peaks obtained in the case that the measurement is made on the fluid including no bubbles, determines that if the difference between the ratios is smaller than the preset value, the error of measurement attributable to the presence of bubbles is negligible, and outputs the signal representing the flow rate according to the first or the second inventions.

On the other hand, if the difference between the ratios is larger than the preset value, the calculation of the zero-cross points is suspended since the probability of emerging the error of measurement attributable to the presence of bubbles is high, and the output hold is effected as described in the first and the second embodiments. In the output hold operation, the measured value of time required for propagation obtained on the last measurement of the repeatedly effected measurements, or the output value of flow rate is adopted to provide the flow rate signal.

The Fourth Embodiment

The fourth embodiment is adapted to be applied to the case in which no attenuation is occurred on the ultrasonic wave. The DSP 10 picks up for example 6 zero-cross points ($q_1$~$q_6$) distributed around the object peak, and the number of zero-cross points to be picked up will be decreased according to the reduction of the amplitude such that four zero-cross points ($q_1$~$q_4$) or two zero-cross points ($q_1$, $q_2$) are to be picked up.

Although the reduction of the number of zero-cross points to be picked up will increase the short-term fluctuation of the measured value, the phenomena caused in the type of the prior art that the stability of the measured value is lucked through the variation of the waveform to be measured can be avoided.

The Fifth Embodiment

The fifth embodiment is adapted to be used in the first to the third ultrasonic flowmeter of the transit-time difference type for the estimation of the time of the zero-cross points from a plurality of data. The estimation can be made by calculating the optimally suitable regression line or curve through the least square method, and find the zero-cross point or points in which the regression line or curve crosses with the time axis (i.e. the axis of abscissa on FIGS. 2–4).

As mentioned in the description of the prior art, the received time is adapted to be detected by the comparator so that the affect of noise cannot be avoided. However, according to the fifth embodiment, the affect of noise can be reduced by employing a plurality of data, and the fluctuation of the measured value can also be reduced by leveling the data on the zero-cross points.

The Sixth Embodiment

Figure 1:
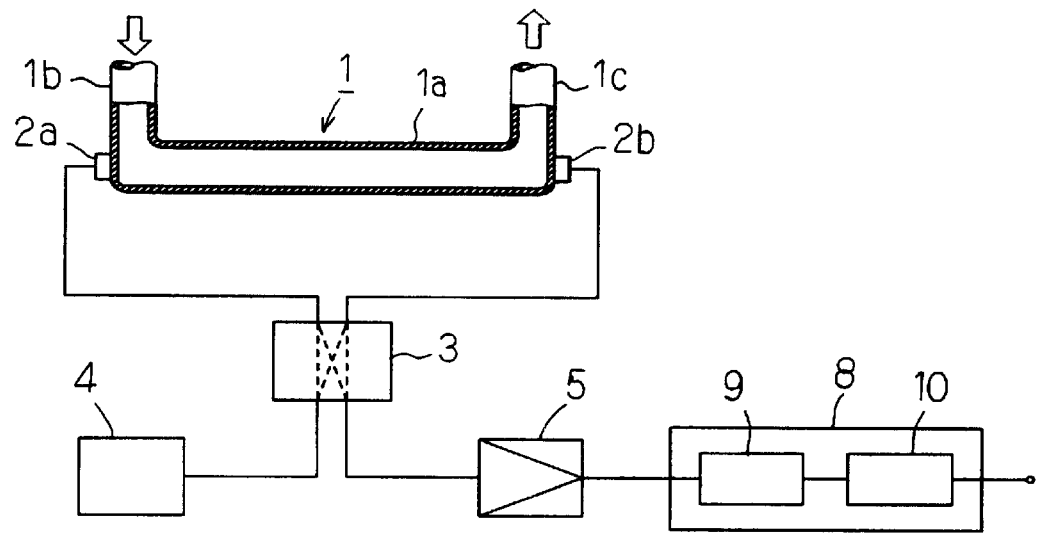
FIG. 1 is a schematic partially broken view showing the general arrangement of the transit-time difference type ultrasonic flowmeter according to the present invention.

The sixth embodiment is an arrangement of the detection section of the ultrasonic flowmeter other than that illustrated in FIG. 1 in which a pair of ultrasonic transducers 2a, 2b are provided on both end of the straight tube 1a of the flow tube 1. The arrangement of the sixth embodiment is so called clamp-on type in which the ultrasonic transducers 11a and 11b are provided around the straight tube of the flow tube 12. The arrangement of the sixth embodiment can also be applied in the same way as that illustrated in FIG. 1, and good results can be obtained.

Figure 5:
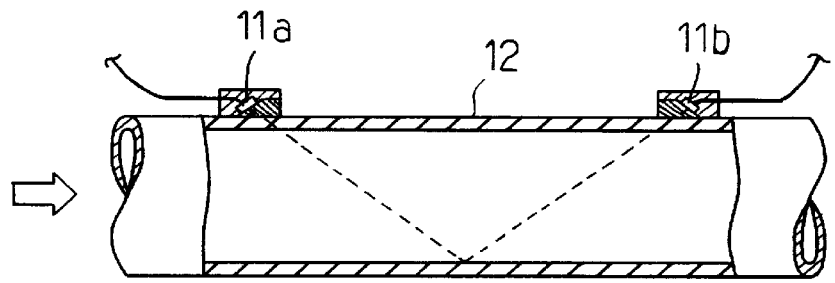
FIG. 5 is a schematic partially broken view showing the arrangement of another detecting section according to the present invention.

Although in the arrangement shown in FIG. 5, the ultrasonic transducers 11a and 11b are provided on the same side on the flow tube 12, the transducers can also be provided on the opposite sides of the flow tube.

Advantages or Effects to be Obtained

As can be seen from the above, in the ultrasonic flowmeter of the present invention the propagation time of the ultrasonic wave can be obtained through the estimation of the zero-cross points distributed around the object peak of the received waveform, so that the interference of the electric pulse noise from outside can be reduced. Further, the stable measured value can be obtained even if the received signal or signals are attenuated by the presence of impurities such as bubbles or solid particles included within the fluid.

In the ultrasonic flowmeter as claimed in claims 6–8, if the amount of the error of the measured value of the flow rate attributable to the impurities such as bubbles within the fluid are substantial, the output hold is adapted to be effected. In this connection, even if the alarm device for monitoring the flow rate output is included, the wrong operation of the alarm device caused by the error of the measured value of the flow rate can be avoided through the output hold. This is the practically obtainable essential advantage.

While particular embodiments of the present invention have been illustrated and described, it should be obvious to those skilled in the art that various changes and modifications can be made without departing from the spirit and scope of the invention.

What is claimed is:

1. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

(b) the data reduction equipment includes an analog-digital converter and a digital signal processor;

(c) the analog-digital converter converts the waveform of the received signal amplified by the amplifier into a plurality of voltage-time data sets; and (d) the digital signal processor picks up on the basis of the data of time an object peak from the waveform of the voltage-time data sets, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures the height of the object peak and estimates the amount of attenuation of the received signal due to the impurities such as bubbles or solid particles included in the fluid, wherein if the amount of attenuation is larger than the predetermined value, the calculation for estimating the zero-cross points is suspended, and the flow rate signal is output by adopting the measured value of time required for propagation or the output value of flow rate obtained on the last measurement of the repeatedly effected measurements.

2. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

(b) the data reduction equipment includes an analog-digital converter and a digital signal processor;

(c) the analog-digital converter converts the waveform of the received signal amplified by the amplifier into a plurality of voltage-time data sets; and (d) the digital signal processor picks up on the basis of the data of time an object peak from the waveform of the voltage-time data sets, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures the height of the object peak, makes a comparison between the height of the object peak when the ultrasonic wave propagates upstream-wards and the height of the object peak when the ultrasonic wave propagates downstream-wards, wherein if the difference between the height of the object peaks is larger than the preset value, the calculation for estimating the zero-cross points is suspended, and the flow rate signal is output by adopting the measured value of time required for propagation or the output value of flow rate obtained on the last measurement of the repeatedly effected measurements.

3. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

(b) the data reduction equipment includes an analog-digital converter and a digital signal processor;

(c) the analog-digital converter converts the waveform of the received signal amplified by the amplifier into a plurality of voltage-time data sets; and (d) the digital signal processor picks up on the basis of the data of time an object peak from the waveform of the voltage-time data sets, estimates at least one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures a ratio defined between the heights of the peaks before and after the zero-cross point which is the object of the measurement of time required for propagation, if the difference between the obtained ratio of the heights of peaks and a ratio obtained upon measured on the fluid including no impurities such as bubbles or solid particles is larger than the preset value, the calculation for estimating the zero-cross points is suspended, and the flow rate signal is output by adopting the measured value of time required for propagation or the output value of flow rate obtained on the last measurement of the repeatedly effected measurements.

4. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

(b) the data reduction equipment includes an analog-digital converter and a digital signal processor;

(c) the analog-digital converter converts the waveform of the received signal amplified by the amplifier into a plurality of voltage-time data sets; and (d) the digital signal processor determines the peak: of maximum voltage included within the waveform of the voltage-time data sets as an object peak, estimates at least: one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures the height of the object peak and estimates the amount of attenuation of the received signal due to the impurities such as bubbles or solid particles included in the fluid, wherein if the amount of attenuation is larger than the predetermined value, the calculation for estimating the zero-cross points is suspended, and the flow rate signal is output by adopting the measured value of time required for propagation or the output value of flow rate obtained on the last measurement of the repeatedly effected measurements.

5. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal, (b) the data reduction equipment includes an analog-digital converter and a digital signal processor;

(c) the analog-digital converter converts the waveform of the received signal amplified by the amplifier into a plurality of voltage-time data sets; and (d) the digital signal processor determines the peak: of maximum voltage included within the waveform of the voltage-time data sets as an object peak, estimates at least: one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures the height of the object peak, makes a comparison between the height of the object peak when the ultrasonic wave propagates upstream-wards and the height of the object peak when the ultrasonic wave propagates downstream-wards, wherein if the difference between the height of the object peaks is larger than the preset value, the calculation for estimating the zero-cross points is suspended, and the flow rate signal is output by adopting the measured value of time required for propagation or the output value of flow rate obtained on the last measurement of the repeatedly effected measurements.

6. A transit-time difference type ultrasonic flowmeter being characterized in that it comprises:

(a) a pair of ultrasonic transducers mounted on an outer surface of a flow tube at an upstream side and a downstream side respectively, a switching device for switching the operational mode of each of the pair of transducers alternatively to its transmitting or receiving mode, an amplifier for amplifying the signal representing the ultrasonic waves propagating through the fluid received by the ultrasonic transducer of the receiving side, and a data reduction equipment for processing the amplified received signal to output a flow rate signal;

(b) the data reduction equipment includes an analog-digital converter and a digital signal processor;

(c) the analog-digital converter converts the waveform of the received signal amplified by the amplifier into a plurality of voltage-time data sets; and (d) the digital signal processor determines the peak: of maximum voltage included within the waveform of the voltage-time data sets as an object peak, estimates at least: one zero-cross point confined by the object peak or a peak adjacent to the object peak through the calculation made on the plurality of voltage-time data sets distributing along the time axis close to the zero-cross points, and finds the time required for propagating the ultrasonic wave from one zero-cross point or the average time required for propagating the ultrasonic wave from a plurality of zero-cross points, the transit-time difference type ultrasonic flowmeter being further characterized in that the digital signal processor measures a ratio defined between the heights of the peaks before and after the zero-cross point which is the object of the measurement of time required for propagation, if the difference between the obtained ratio of the heights of peaks and a ratio obtained upon measured on the fluid including no impurities such as bubbles or solid particles is larger than the preset value, the calculation for estimating the zero-cross points is suspended, and the flow rate signal is output by adopting the measured value of time required for propagation or the output value of flow rate obtained on the last measurement of the repeatedly effected measurements.

* * * * *